United States Patent
Nagata et al.

(10) Patent No.: US 9,473,996 B2
(45) Date of Patent: Oct. 18, 2016

(54) COMMUNICATION CONTROL DEVICE AND COMMUNICATION CONTROL METHOD

(75) Inventors: Satoshi Nagata, Chiyoda-ku (JP);
Tetsushi Abe, Chiyoda-ku (JP);
Hideaki Takahashi, Chiyoda-ku (JP);
Mikio Iwamura, Chiyoda-ku (JP);
Takehiro Nakamura, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/114,699

(22) PCT Filed: May 21, 2012

(86) PCT No.: PCT/JP2012/062960
§ 371 (c)(1),
(2), (4) Date: Oct. 29, 2013

(87) PCT Pub. No.: WO2012/165200
PCT Pub. Date: Dec. 6, 2012

(65) Prior Publication Data
US 2014/0162662 A1 Jun. 12, 2014

(30) Foreign Application Priority Data
May 27, 2011 (JP) .................................. 2011-119734

(51) Int. Cl.
*H04W 36/20* (2009.01)
*H04W 28/16* (2009.01)
*H04W 72/04* (2009.01)

(52) U.S. Cl.
CPC ............ *H04W 36/20* (2013.01); *H04W 28/16* (2013.01); *H04W 72/0486* (2013.01)

(58) Field of Classification Search
None
See application file for complete search history.

(56) References Cited

U.S. PATENT DOCUMENTS

| | | | |
|---|---|---|---|
| 8,805,398 B2 * | 8/2014 | Morita | H04W 52/143 370/311 |
| 9,332,474 B2 * | 5/2016 | Sun | H04W 36/30 |
| 2004/0117432 A1 | 6/2004 | Kitami et al. | |
| 2005/0025079 A1 | 2/2005 | Terabe | |
| 2005/0124369 A1 | 6/2005 | Attar et al. | |

(Continued)

FOREIGN PATENT DOCUMENTS

| | | |
|---|---|---|
| EP | 0 856 955 A2 | 8/1998 |
| JP | 2007 507152 | 3/2007 |
| JP | 2010 283440 | 12/2010 |

OTHER PUBLICATIONS

"On data channel performance with cell range expansion and non-full buffer traffic", Ericsson, ST-Ericsson, 3GPP TSG RAN WG1 Meeting #62bis, R1-105336, (Total 8 Pages), (Oct. 2010).

(Continued)

*Primary Examiner* — Hilina K Demeter
(74) *Attorney, Agent, or Firm* — Oblon, McClelland, Maier & Neustadt, L.L.P.

(57) ABSTRACT

A communication control device includes a parameter acquisition unit which acquires a first parameter determined on the basis of the number of mobile stations connected to the first cell or the number of mobile stations connected to the second cell, a parameter determination unit which changes the number of mobile stations connectable to the first cell or the number of mobile stations connectable to the second cell on the basis of the first parameter, and a parameter notification unit which notifies at least any one of the first base station and the second base station of the determined second parameter.

2 Claims, 13 Drawing Sheets

(56) References Cited

U.S. PATENT DOCUMENTS

| | | | | |
|---|---|---|---|---|
| 2005/0130644 A1* | 6/2005 | Bassompierre | ....... | H04W 16/32 455/422.1 |
| 2007/0140160 A1* | 6/2007 | Lee | ..................... | H04W 52/143 370/329 |
| 2009/0061799 A1 | 3/2009 | Park et al. | | |
| 2010/0069063 A1* | 3/2010 | Osterling | .............. | H04W 36/20 455/434 |
| 2011/0211560 A1* | 9/2011 | Yamamoto | ............ | H04W 36/20 370/332 |
| 2011/0244863 A1* | 10/2011 | Matsuo | ................. | H04W 36/04 455/436 |
| 2011/0306347 A1* | 12/2011 | Choi | ..................... | H04W 36/04 455/438 |
| 2012/0026972 A1* | 2/2012 | Miao | ................. | H04W 36/0072 370/331 |
| 2012/0113844 A1* | 5/2012 | Krishnamurthy | ..... | H04L 1/0026 370/252 |
| 2012/0115527 A1* | 5/2012 | Narasimha | ............ | H04W 24/10 455/513 |
| 2012/0122472 A1* | 5/2012 | Krishnamurthy | ..... | H04L 5/0053 455/456.1 |
| 2012/0188884 A1* | 7/2012 | Simonsson | ....... | H04W 36/0083 370/252 |
| 2013/0017793 A1* | 1/2013 | Henttonen | ............ | H04W 52/52 455/63.1 |
| 2013/0028199 A1* | 1/2013 | Song | ..................... | H04W 16/12 370/329 |
| 2013/0079049 A1* | 3/2013 | Yu | ......................... | H04W 48/16 455/524 |
| 2014/0307648 A1* | 10/2014 | Nagata | .................. | H04W 16/32 370/329 |
| 2015/0237634 A1* | 8/2015 | Sandberg | .......... | H04W 72/0486 370/331 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300, vol. 10.3.0, (Total 197 Pages), (Mar. 2011).
International Search Report Issued Jul. 24, 2012 in PCT/JP12/62960 Filed May 21, 2012.
Extended Search Report issued Oct. 20, 2015 in European Patent Application No. 12793188.9.
Chinese Office Action dated Jan. 5, 2016, issued in Chinese Patent Application No. 201280020679.X (with English translation).

\* cited by examiner

FIG. 3
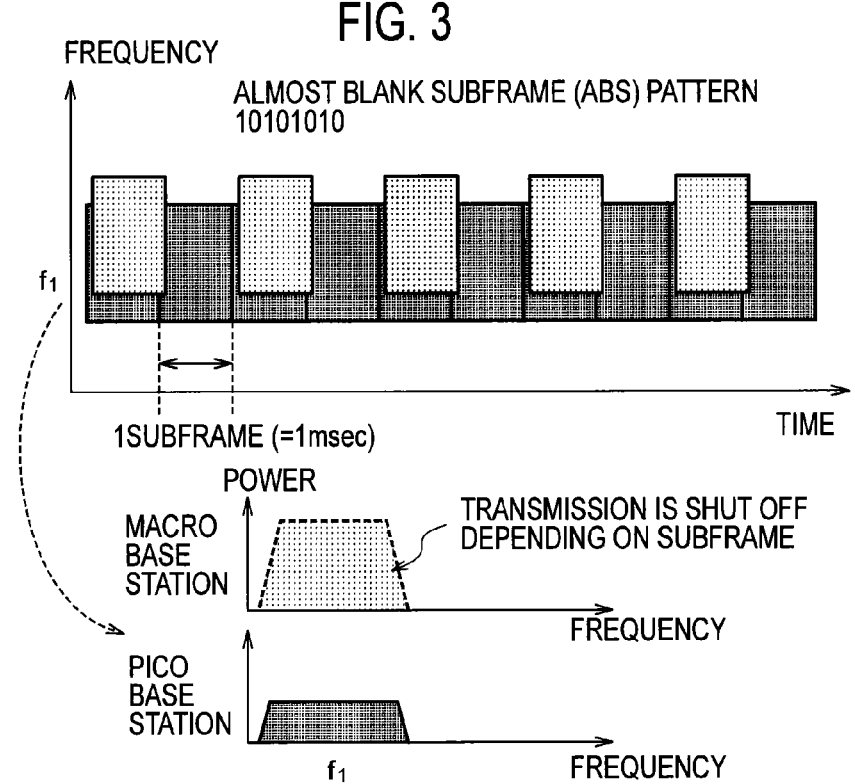
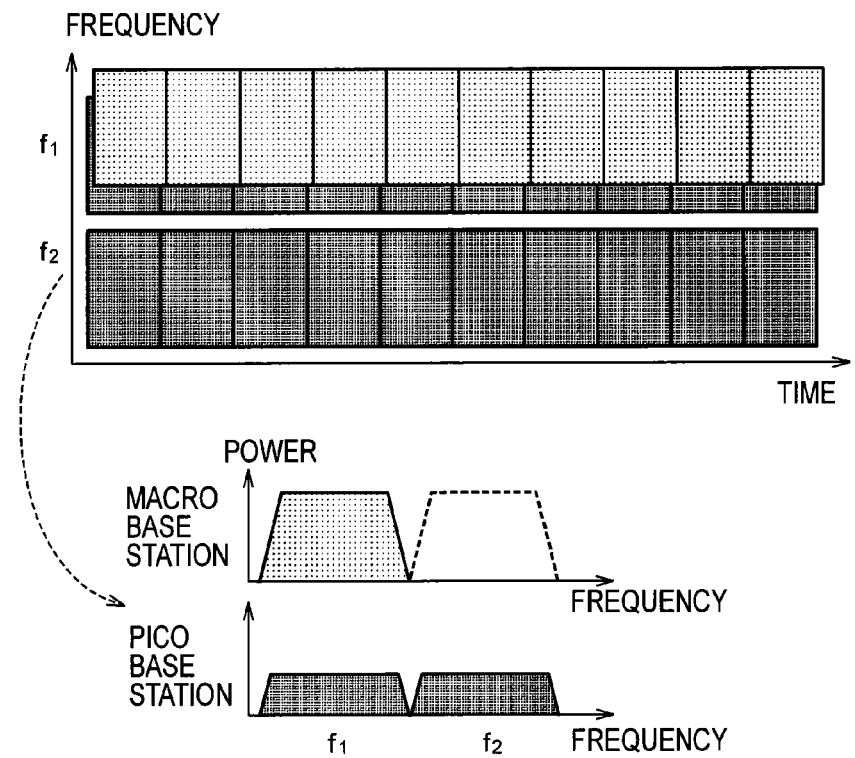

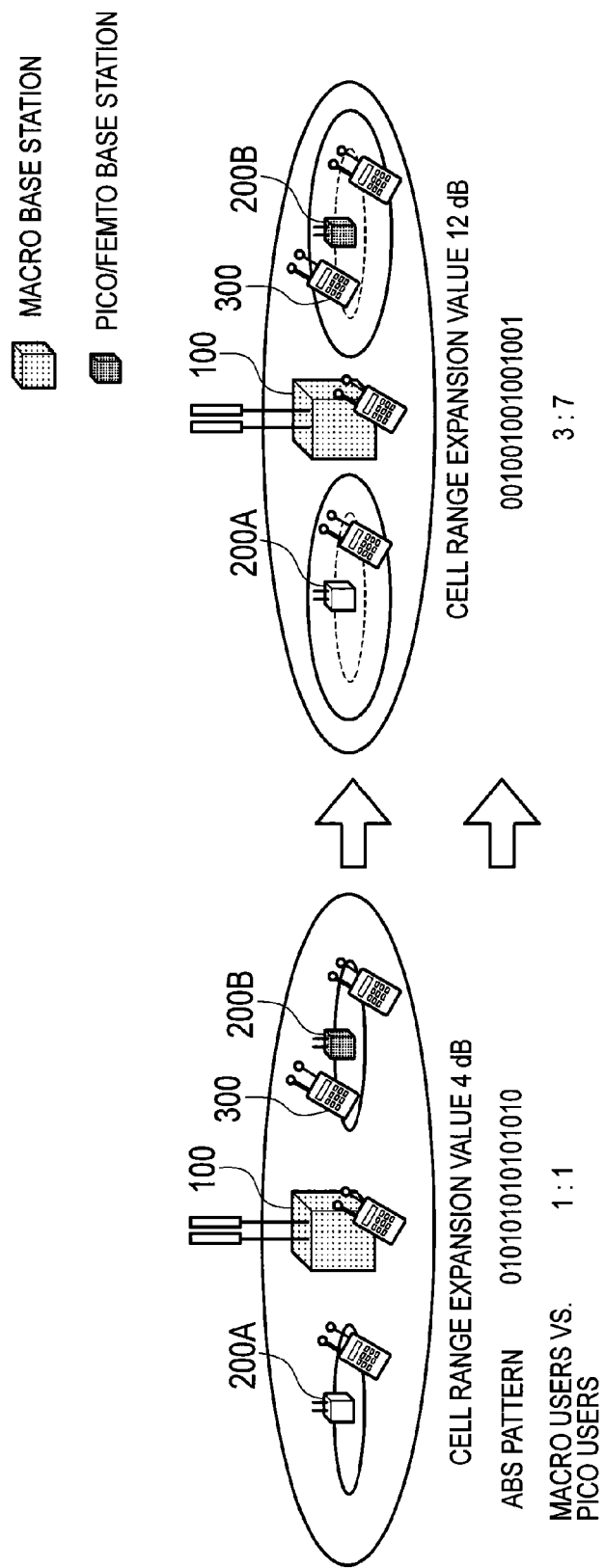

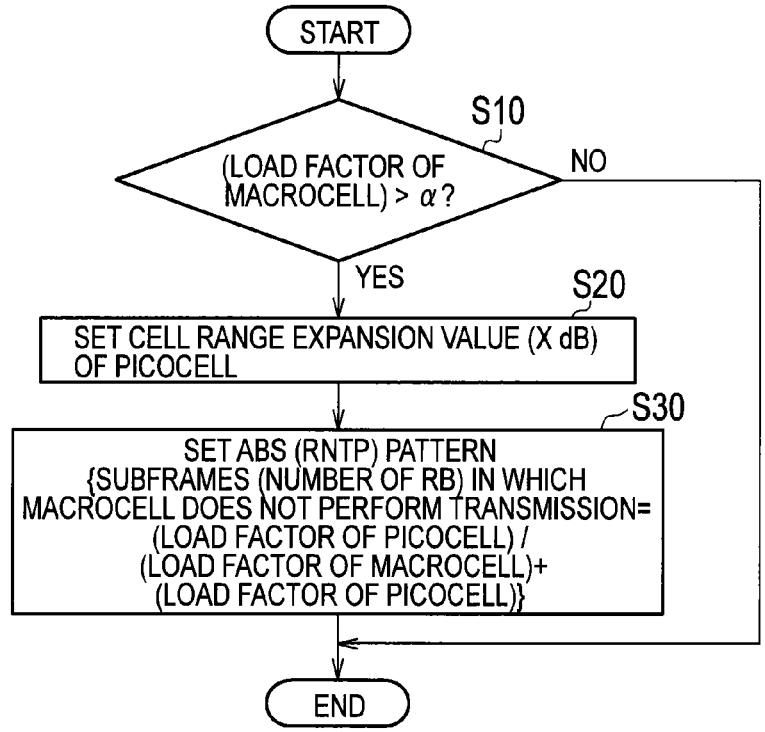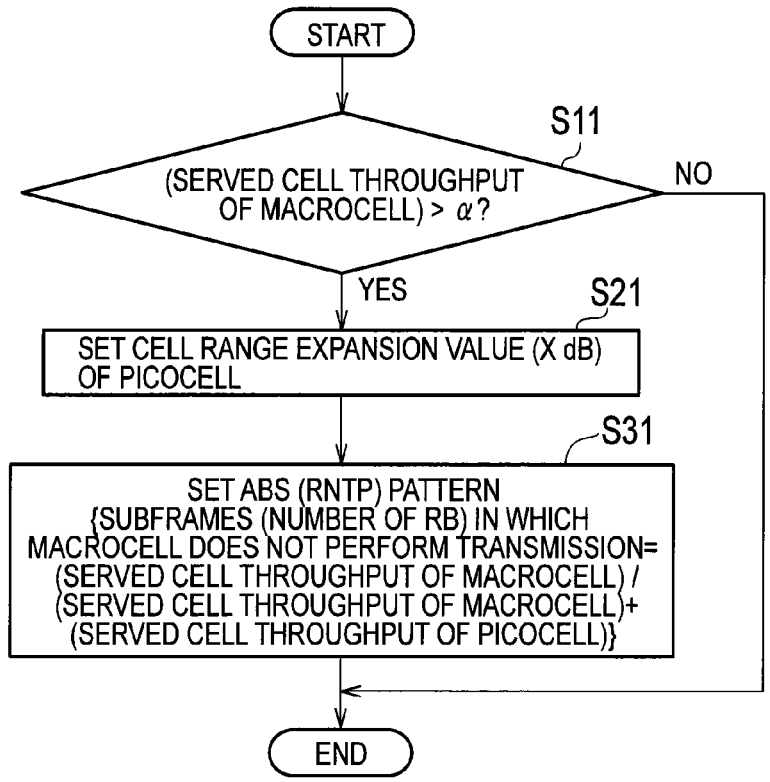

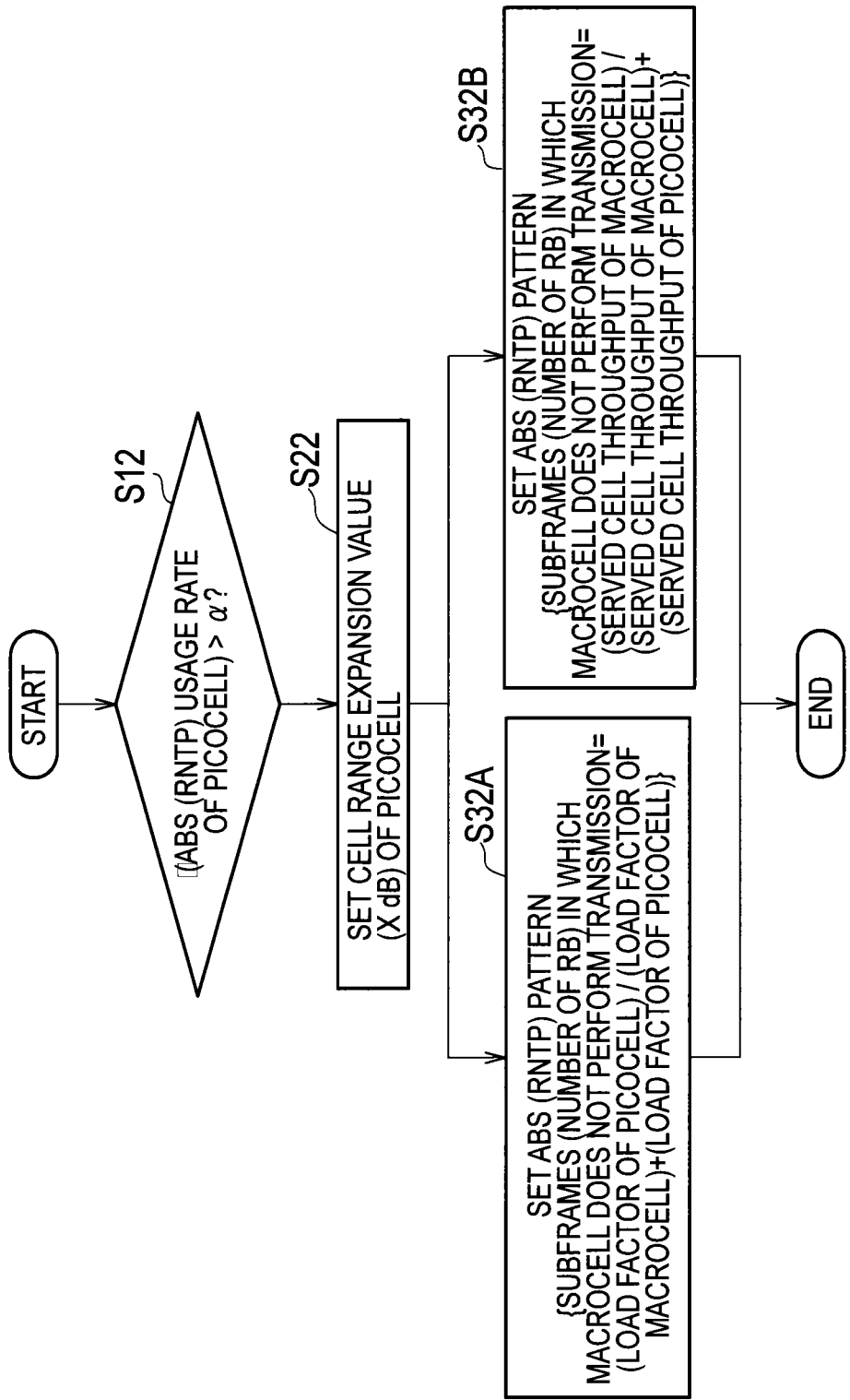

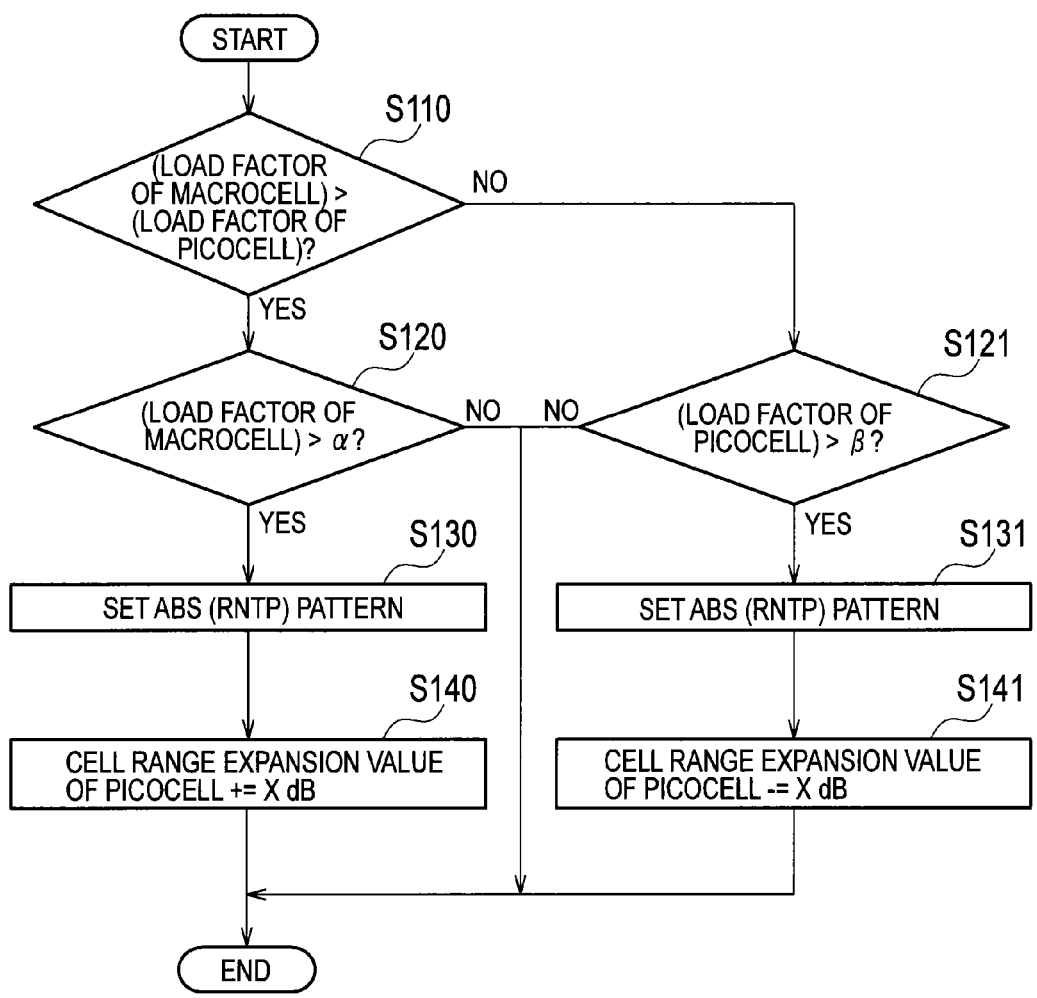

FIG. 14
(a)
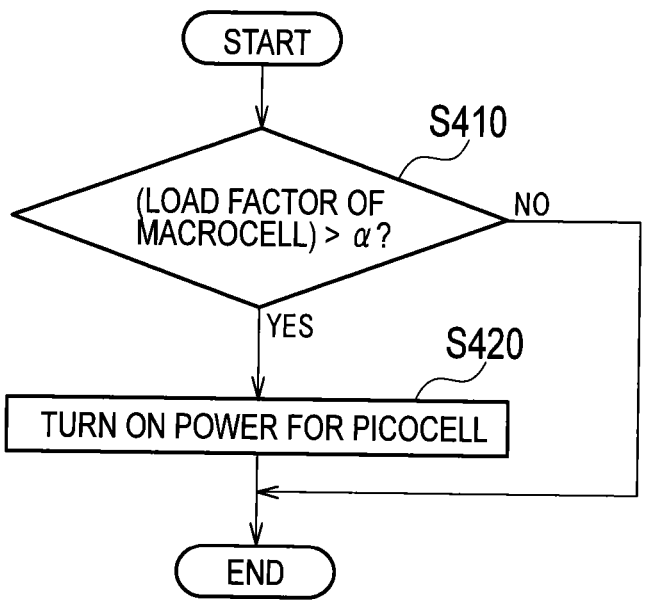
(b)
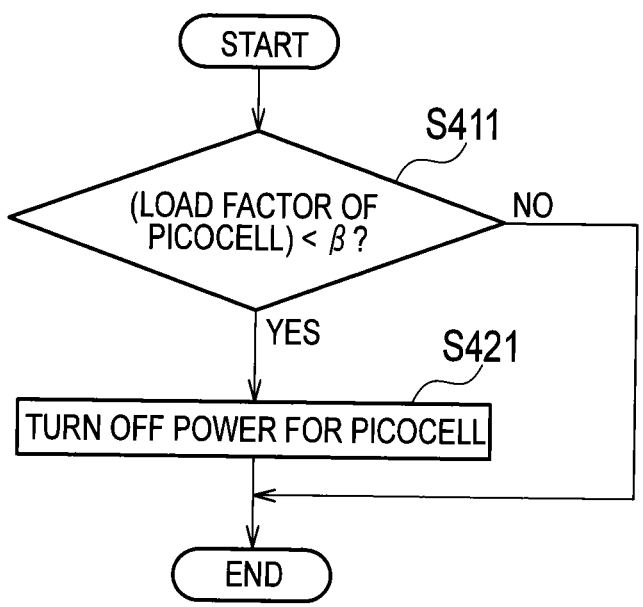

COMMUNICATION CONTROL DEVICE AND COMMUNICATION CONTROL METHOD

TECHNICAL FIELD

The present invention relates to a communication control device and a communication control method which control base stations, or more specifically, to a communication control device and a communication control method which control parameters concerning inter-cell interference coordination.

BACKGROUND ART

The Long Term Evolution-Advanced (LTE-A) currently under standardization by the 3rd Generation Partnership Project GPP) defines a heterogeneous network (HetNet), which is an overlay network using various types of cells with different transmission power levels, such as picocells, femtocells, remote radio heads (RRHs) besides conventional macrocells (see Non-patent Document 1, for example).

The heterogeneous network prescribes application of cell range expansion in which a cell radius of a picocell or the like is expanded by applying a bias to reception quality (received power) used in cell selection by a mobile station. Thus, when a macrocell is overlaid on a picocell or the like, it is possible to offload more traffic from the macrocell to the picocell.

A mobile station handed over to the picocell as a result of application of the bias receives large interference from the macrocell because the mobile station is situated in an environment usually well connectable to the macrocell. This is why enhanced inter-cell interference coordination (eICIC) is necessary. Specifically, there is known inter-cell interference coordination to avoid interference by causing a macrocell and a picocell to use different radio resources in a time domain or a frequency domain.

For example, in the inter-cell interference coordination in the time domain, radio resource blocks in the time domain for the macrocell to transmit a radio signal are determined by an almost blank subframe (ABS) pattern which controls the time domain to be allocated to the macrocell.

PRIOR ART DOCUMENT

Non-Patent Document

Non-patent document 1: 3GPP TS 36.300 V10.3.0, Evolved Universal Terrestrial Radio Access (E-UTRA) and Evolved Universal Terrestrial Radio Access Network (E-UTRAN); Overall description; Stage 2 (Release 10), March 2011.

SUMMARY OF THE INVENTION

However, the above-described inter-cell interference coordination has the following problem. In the case of the inter-cell interference coordination in the time domain, for example, the optimum ABS pattern for the number of mobile stations connected to the macrocell and the picocell changes from moment to moment depending on a cell range expansion value (dB). In this case, there is a problem of a failure to determine the optimum ABS pattern.

The present invention has been made in view of the aforementioned circumstances. An objective of the invention is to provide a communication control device and a communication control method which are capable of autonomously optimizing a parameter that changes depending on inter-cell interference coordination in a heterogeneous network.

A first aspect of the present invention provides a communication control device (a communication control device 50) configured to control a first base station (a base station 100) forming a first cell (a macrocell C11) having a predetermined cell radius and a second base station (such as a base station 200A) forming a second cell (such as a picocell C21) having a cell radius smaller than the predetermined cell radius. Here, the device includes: an acquisition unit (a parameter acquisition unit 51) configured to acquire a first parameter determined on the basis of the number of mobile stations connected to the first cell or the number of mobile stations connected to the second cell; a determination unit (a parameter determination unit 53) configured to determine a second parameter on the basis of the first parameter acquired by the acquisition unit, the second parameter causing a change in the number of mobile stations connectable to the first cell or the number of mobile stations connectable to the second cell; and a notification unit (a parameter notification unit 55) configured to notify at least any one of the first base station and the second base station of the second parameter determined by the determination unit.

A second aspect of the present invention provides a communication control method of controlling a first base station forming a first cell having a predetermined cell radius and a second base station forming a second cell having a cell radius smaller than the predetermined cell radius. Here, the method includes the steps of: acquiring a first parameter determined on the basis of the number of mobile stations connected to the first cell or the number of mobile stations connected to the second cell; determining a second parameter on the basis of the acquired first parameter, the second parameter causing a change in the number of mobile stations connectable to the first cell or the number of mobile stations connectable to the second cell; and notifying at least anyone of the first base station and the second base station of the determined second parameter.

BRIEF DESCRIPTION OF THE DRAWINGS

FIG. 3 is an explanatory view of inter-cell interference coordination in a time domain and a frequency domain.

FIG. 4 is an explanatory view of a control example of an ABS (RNTP) pattern by the communication control device 50 according to the embodiment of the present invention.

FIG. 5 is a view showing an operational flow in Control Example 1 of the ABS (RNTP) pattern by the communication control device 50 according to the embodiment of the present invention.

FIG. 6 is a view showing an operational flow in Control Example 2 of the ABS (RNTP) pattern by the communication control device 50 according to the embodiment of the present invention.

FIG. 7 is a view showing an operational flow in Control Example 3 of the ABS (RNTP) pattern by the communication control device 50 according to the embodiment of the present invention.

FIG. 8 is a view showing an operational flow in Control Example 1 of a cell range expansion value by the communication control device 50 according to the embodiment of the present invention.

FIG. 14 is a view showing operational flows of the control example of the picocell transmission power by the communication control device 50 according to the embodiment of the present invention.

MODE FOR CARRYING OUT THE INVENTION

Next, an embodiment of the present invention will be described below. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of a Mobile Communication System

Figure 1:
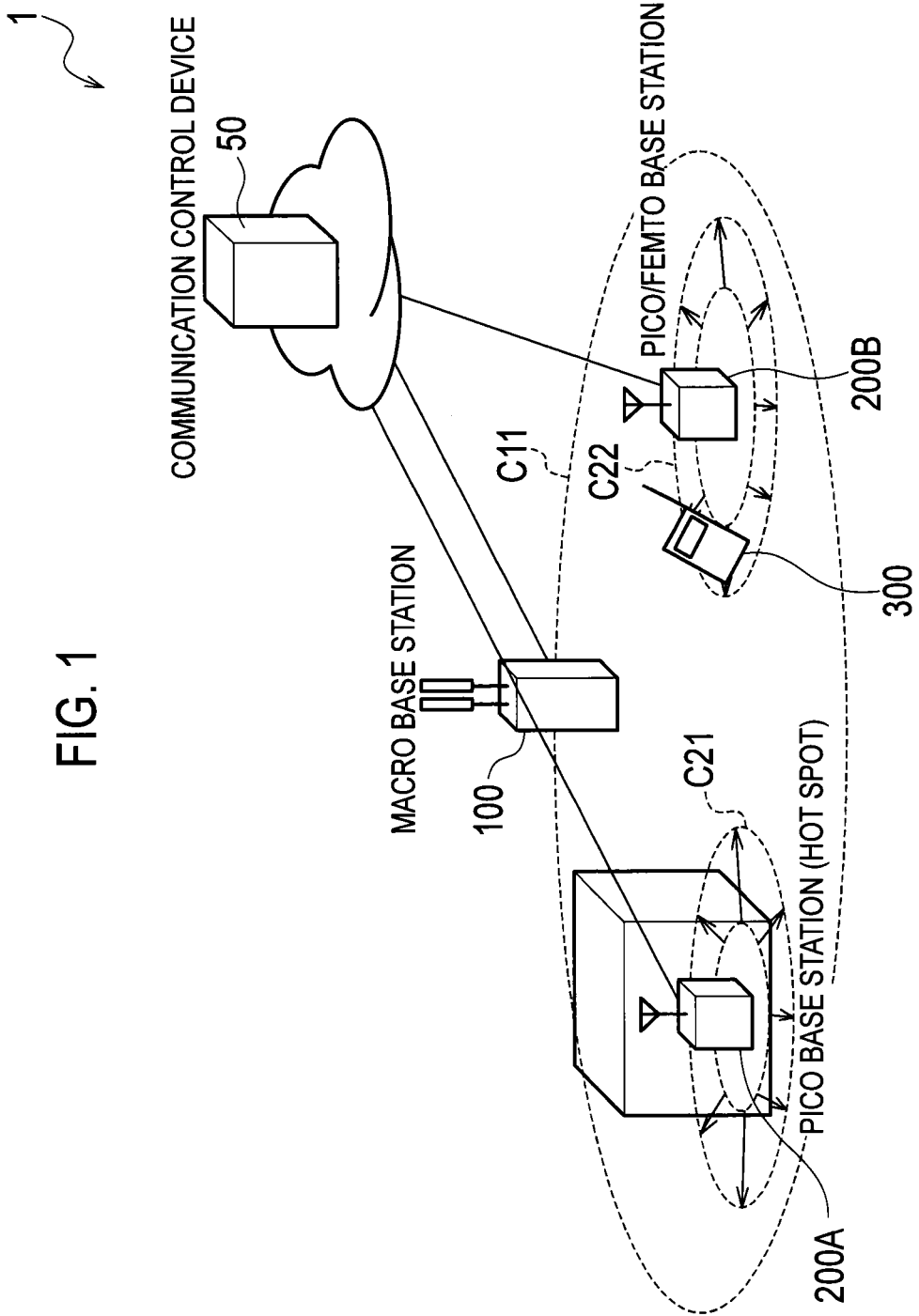
FIG. 1 is an overall schematic configuration diagram of a mobile communication system 1 according to an embodiment of the present invention.

FIG. 1 is an overall schematic configuration diagram of a mobile communication system 1 according to an embodiment of the present invention. As shown in FIG. 1, the mobile communication system 1 includes a communication control device 50, a base station 100, base stations 200A, 200B, and a mobile station 300. The mobile communication system 1 is, for instance, a mobile communication system in compliance with the Long Term Evolution-Advanced (LTE-A) currently under standardization by the 3rd Generation Partnership Project (3GPP).

The communication control device 50 controls the base station 100 and the base stations 200A, 200B. A mobility management entity (MME), for example, can be used as the communication control device 50. Alternatively, the communication control device 50 may be provided inside the base station 100.

The base station 100 is a macro base station which forms a macrocell. The base station 100 constitutes a first base station which forms a macrocell C11 (a first cell) having a predetermined cell radius.

Each base station 200A, 200B is a pico base station which forms a picocell (or a femtocell). The base station 200A constitutes a second base station which forms a picocell C21 (a second cell) having a cell radius smaller than the cell radius of the macrocell C11. Similarly, the base station 200B forms a picocell C22. The base station 200A (200B) may be installed in a building or the like and may form a so-called hot spot.

In this way, the mobile communication system 1 configures a heterogeneous network (HetNet) which is an overlay network using various types of cells with different transmission power levels.

The mobile station 300 is a terminal device which executes radio communication with the base station 100 and the base stations 200A, 200B.

Meanwhile, enhanced inter-cell interference coordination (eICIC) for avoiding interference between the base station 100 and the base stations 200A, 200B is introduced to the mobile communication system 1. The mobile communication system 1 autonomously optimizes a parameter that changes depending on the inter-cell interference coordination.

(2) Functional Block Configuration of Communication Control Device

Figure 2:
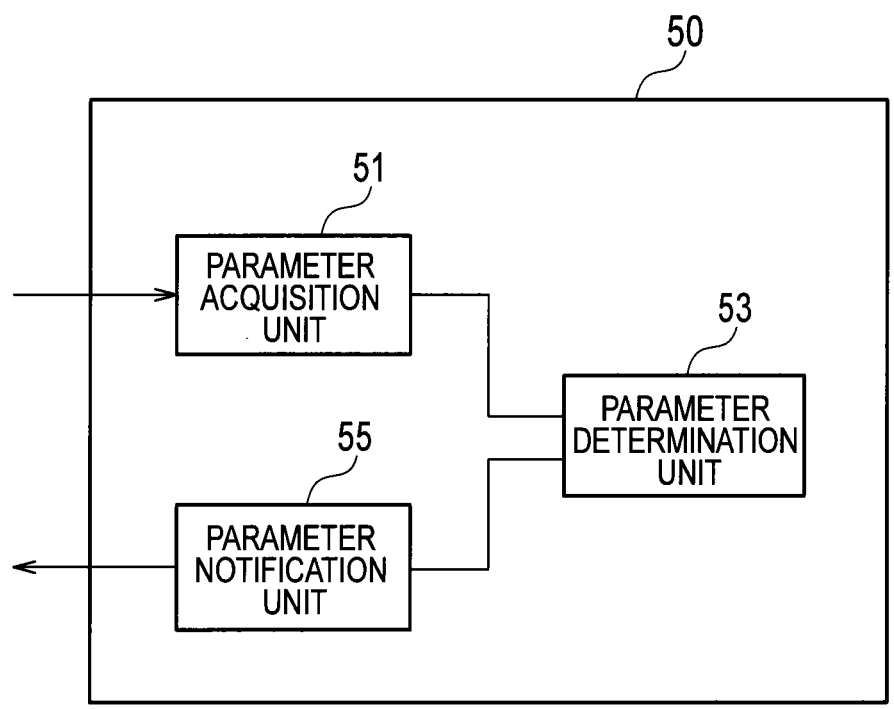
FIG. 2 is a functional block configuration diagram of a communication control device 50 according to the embodiment of the present invention.

FIG. 2 is a functional block configuration diagram of the communication control device 50. As shown in FIG. 2, the communication control device 50 includes a parameter acquisition unit 51, a parameter determination unit 53, and a parameter notification unit 55.

The parameter acquisition unit 51 acquires a parameter used for the inter-cell interference coordination. Specifically, the parameter acquisition unit 51 acquires a parameter (a first parameter) determined on the basis of the number of mobile stations connected to the macrocell C11 or the number of mobile stations connected to any of the picocells C21, C22.

In this embodiment, the parameter acquisition unit 51 acquires a load factor of any of the macrocell C11 and the picocells C21, C22, throughput of any of the macrocell C11 and the picocells C21, C22, or a usage rate of any of the macrocell C11 and the picocells C21, C22. Further specific examples of the first parameter will be described later.

The parameter determination unit 53 determines another parameter for controlling any of the base station 100 and the base stations 200A, 200B on the basis of the parameter acquired by the parameter acquisition unit 51. Specifically, the parameter determination unit 53 determines a parameter (a second parameter) to cause a change in any of the number of mobile stations 300 connectable to the macrocell C11 and the number of mobile stations 300 connectable to any of the picocells C21, C22.

In this embodiment, the parameter determination unit 53 determines a radio resource block in a time domain to be allocated to any of the macrocell C11 and the picocells C21, C22, a radio resource block in a frequency domain to be allocated to any of the macrocell C11 and the picocells C21, C22, or a value of transmission power of any of the macrocell C11 and the picocells C21, C22.

Specifically, the parameter determination unit 53 determines any of a size of the radio resource block in the time domain, a size of the radio resource block in the frequency domain, and a value of the transmission power on the basis of any of a load factor ratio among the macrocell C11 and the picocells C21, C22, a throughput ratio among the macrocell C11 and the picocells C21, C22, and a usage rate ratio among the macrocell C11 and the picocells C21, C22.

Further specific features of the method of determining the parameter will be described later.

The parameter notification unit 55 notifies at least any one of the base station 100 and the base stations 200A, 200B of the parameter determined by the parameter determination unit 53.

Now, examples of the parameter (the second parameter) used in this embodiment will be described. FIG. 3(*a*) is an explanatory view of inter-cell interference coordination in a time domain. FIG. 3(*b*) is an explanatory view of inter-cell interference coordination in a frequency domain.

As shown in FIG. 3(*a*), in the inter-cell interference coordination in the time domain, radio resource blocks in the time domain where the base station 100 (the macro base station) can perform transmission in the time domain are defined on the basis of an almost blank subframe pattern. Since the example shown in FIG. 3(*a*) represents a pattern in which "1010 . . . " is repeated, the base station 100 transmits a radio signal once every subframe (1 ms). When the above-described almost blank subframe (ABS) pattern is used, transmission timing of the radio signals needs to be controlled by synchronizing the base station 100 and any of the base stations 200A, 200B with each another.

Meanwhile, as shown in FIG. 3(*b*), a radio resource block to be allocated only to the base station 200A (a pico base station) is defined in the inter-cell interference coordination in the frequency domain. Specifically, a frequency band f1 is allocated to the macro base station and the pico base station whereas a frequency band f2 is allocated only to the pico base station.

In this embodiment, the communication control device 50 autonomously controls the ABS pattern used in the inter-cell interference coordination in the time domain and a relative narrowband TX power (RNTP) pattern used in the inter-cell interference coordination in the frequency domain on the basis of the value of the parameter (the first parameter) acquired by the parameter acquisition unit 51.

(3) Control Examples

Next, control expels of the base station 100 and the base stations 200A, 200B by the communication control device 50 will be described.

In this embodiment, the parameter determination unit 53 of the communication control device 50 optimizes the following parameters (the second parameters).

(a) Almost blank subframe (ABS) pattern
(b) Relative narrowband TX power (RNTP) pattern
(c) Cell range expansion value
(d) Transmission power (including transmission power control parameter)
(e) Tilt angle of transmission antenna In the meantime, the parameter acquisition unit 51 of the communication control device 50 acquires the following parameters (the first parameters) each serving as a trigger for executing optimization of the corresponding second parameter.

(a) Load Factors of Macrocell and Picocell

Here, a load factor is expressed by (the number of mobile stations connected to the cell per second). When the traffic model is a full buffer model, the load factor corresponds to a ratio between the numbers of mobile stations (users) connected to the macrocell or the picocell.

(b) Served Cell Throughput Respectively Transmitted by Macrocell and Picocell

Here, the served cell throughput is defined in 3GPP TR36.814 as follows:

Served cell throughput=total amount of data for all users/total amount of observation time Considering the traffic model, it is preferable to employ the served cell throughput as the parameter.

(c) ABS (RNTP) Usage Rate of Picocell

Specific control examples of the base station 100 and the base stations 200A, 200B by the communication control device 50 using the above-described first parameters and second parameters will be explained below.

(3.1) ABS (RNTP) Pattern

First, control examples of the ABS (RNTP) pattern will be described with reference to FIG. 4 to FIG. 7.

(3.1.1) Control Example 1

FIG. 4 is an explanatory view of a control example of the ABS (RNTP) pattern by the communication control device 50. As shown in FIG. 4, in Control Example 1, the communication control device 50 controls either the ABS pattern or an RNTP pattern, which indicates transmission power of a radio signal in a designated frequency band, on the basis of the load factors of the macrocell and the picocell.

For instance, FIG. 4 shows the example of the case where the cell range expansion value, which indicates an amount of transmission power increased for expanding the cell radius of the picocell C21, C22, is changed from 4 dB to 12 dB. Assuming that a ratio between the numbers of users of the macrocell and the picocell is 1:1 when the cell range expansion value is 4 dB and is 3:7 when the cell range expansion value is 12 dB, percentage of the number of subframes (i.e., the number of radio resource blocks (RB)), in which the base station 100 (the macro base station) does not perform transmission, is changed from 50% to 70%.

In other words, when the cell range expansion value is increased, the communication control device 50 selects such an ABS pattern that increases the percentage of the number of subframes in which the base station 100 (the macro base station) does not perform transmission.

FIG. 5 shows an operational flow in Control Example 1 of the ABS (RNTP) pattern by the communication control device 50. As shown in FIG. 5, the communication control device 50 determines whether or not the load factor of the macrocell is greater than a predetermined value α (S10). If the load factor of the macrocell is greater than the value α, the communication control device 50 determines the cell range expansion value (such as 4 dB) of the picocell (S20), and sets the ABS or RNTP pattern on the basis of the number of the mobile stations 300 under the setting of the cell range expansion value thus determined (S30). Specifically, the communication control device 50 calculates the number of subframes (the number of RB) in which the macrocell does not perform transmission by using the following formula: (the load factor of the picocell)/(the load factor of the macrocell)+(the load factor of the picocell).

(3.1.2) Control Example 2

FIG. 6 shows an operational flow in Control Example 2 of the ABS (RNTP) pattern by the communication control device 50. In Control Example 2, the communication control device 50 controls the ABS pattern or the RNTP pattern on the basis of served cell throughput respectively transmitted by the macrocell and the picocell. As shown in FIG. 6, the communication control device 50 determines the cell range expansion value (x dB) of the picocell by similar processing to that in Control Example 1, and sets the ABS or RNTP pattern on the basis of the number of the mobile stations 300 under the setting of the cell range expansion value thus determined (S11 to S31).

Specifically, the communication control device 50 calculates the number of subframes (the number of RB) in which the macrocell does not perform transmission by using the following formula: (the served cell throughput of the macrocell)/(the served cell throughput of the macrocell)+(the served cell throughput of the picocell).

(3.1.3) Control Example 3

FIG. 7 shows an operational flow in Control Example 3 of the ABS (RNTP) pattern by the communication control device 50. In Control Example 3, the communication control device 50 controls the ABS pattern or the RNTP pattern on the basis of an ABS (RNTP) usage rate of the picocell.

As shown in FIG. 7, the communication control device 50 determines the cell range expansion value (x dB) of the picocell by similar processing to that in Control Example 1, and sets the ABS or RNTP pattern on the basis of the number of the mobile stations 300 under the setting of the cell range expansion value thus determined (S12 to S32B). For example, the ABS usage rate is 50% in the case of the ABS pattern in which "1010 . . . " is repeated. Similarly, the number of RB in which transmission is performed at transmission power exceeding an RNTP threshold is 50% in the case of the RNTP pattern of "1010 . . . ".

Specifically, the communication control device 50 calculates the number of subframes (the number of RB) in which the macrocell does not perform transmission by using the following formula: (the load factor of the picocell)/(the load factor of the macrocell)+(the load factor of the picocell) (S32A). Alternatively, the communication control device 50 calculates the number of subframes (the number of RB) in which the macrocell does not perform transmission by using the following formula: (the served cell throughput of the macrocell)/(the served cell throughput of the macrocell)+ (the served cell throughput of the picocell) (S32B).

(3.2) Cell Range Expansion Value

Next, control examples of the cell range expansion value will be described with reference to FIG. 8 to FIG. 11.

(3.2.1) Control Example 1

FIG. 8 shows an operational flow in Control Example 1 of the cell range expansion value by the communication control device 50. In Control Example 1, the communication control device 50 controls the cell range expansion value of the picocell on the basis of the load factors of the macrocell and the picocell. Specifically, when the load factor of the macrocell is increased, the cell range expansion value of the picocell formed inside the macrocell is increased, thereby offloading the traffic (the mobile stations 300) from the macrocell to the picocell.

Specifically, as shown in FIG. 8, the communication control device 50 determines whether or not the load factors of the macrocell and the picocell are greater than predetermined values ($\alpha$, $\beta$) (S110 to S121). Subsequently, the communication control device 50 sets the ABS or RNTP pattern (S130, S131) on the basis of the load factor of the macrocell or the picocell, and sets the cell range expansion value of the picocell by which the load factor of the macrocell becomes equal to the load factor of the picocell (S140, S141), for example. Here, the cell range expansion value does not always have to be the value to make the load factor of the macrocell equal to the load factor of the picocell. Instead, the cell range expansion value may be such a value to make a difference between the load factor of the macrocell and the load factor of the picocell within a predetermined range.

For example, the communication control device 50 calculates the load factors of the macrocell and the picocell when the cell range expansion value is 4 dB as well as the load factors of the macrocell and the picocell when the cell range expansion value is 12 dB, and sets the cell range expansion value (such as 12 dB) of the picocell by which the load factor of the macrocell becomes equal to the load factor of the picocell.

(3.2.2) Control Example 2

Figure 9:
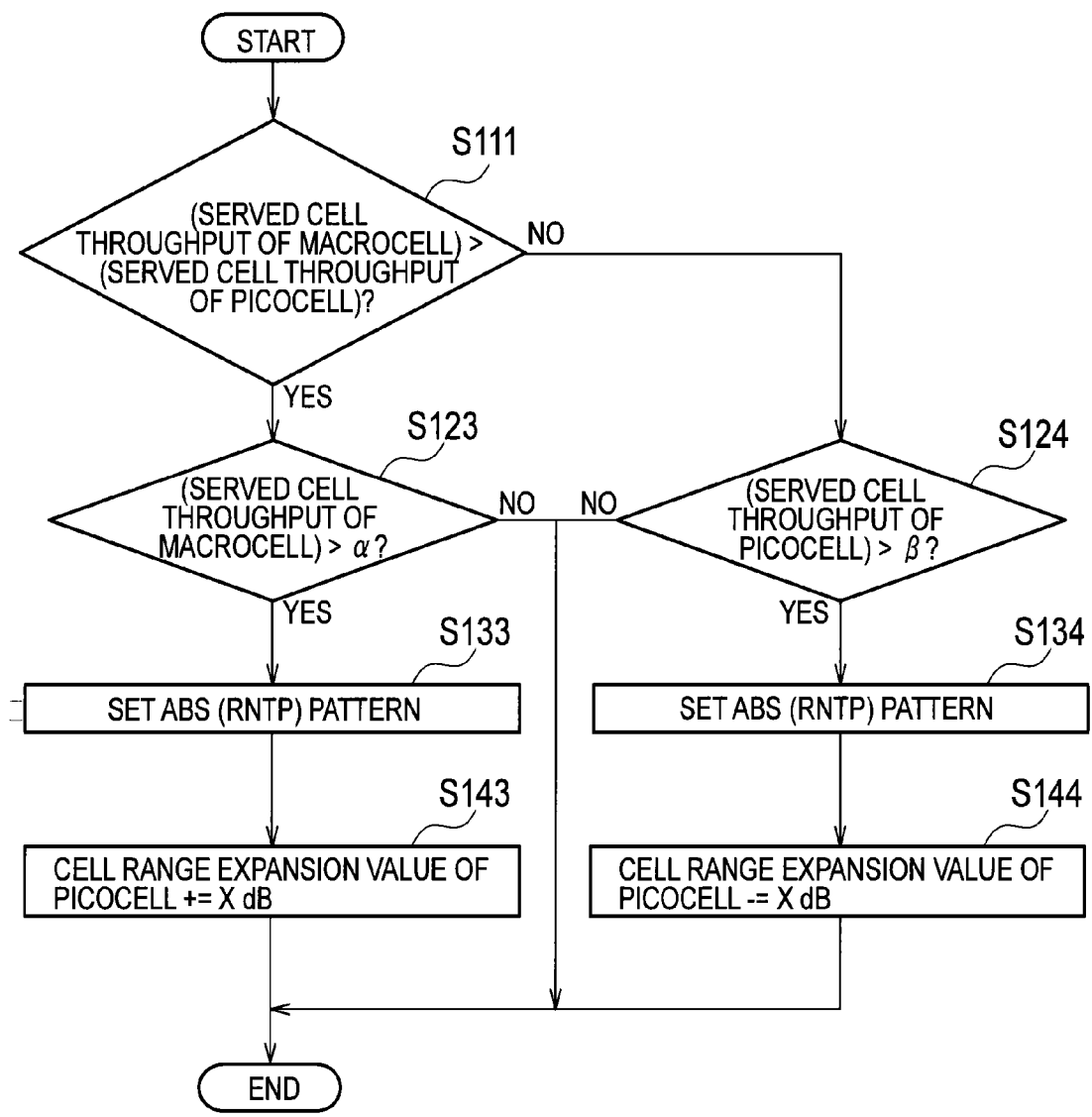
FIG. 9 is a view showing an operational flow in Control Example 2 of the cell range expansion value by the communication control device 50 according to the embodiment of the present invention.

FIG. 9 shows an operational flow in Control Example 2 of the cell range expansion value by the communication control device 50. In Control Example 2, the communication control device 50 controls the cell range expansion value of the picocell on the basis of the served cell throughput respectively transmitted by the macrocell and the picocell.

As shown in FIG. 9, the communication control device 50 determines whether or not values of the served cell throughput of the macrocell and the picocell are greater than the predetermined values ($\alpha$, $\beta$) (S111 to S124) by similar processing to that in Control Example 1. Subsequently, the communication control device 50 sets the ABS or RNTP pattern (S133, S134) on the basis of the served cell throughput of the macrocell or the picocell, and sets the cell range expansion value of the picocell by which the load factor of the macrocell becomes equal to the load factor of the picocell (S143, S144), for example.

(3.2.3) Control Example 3

Figure 10:
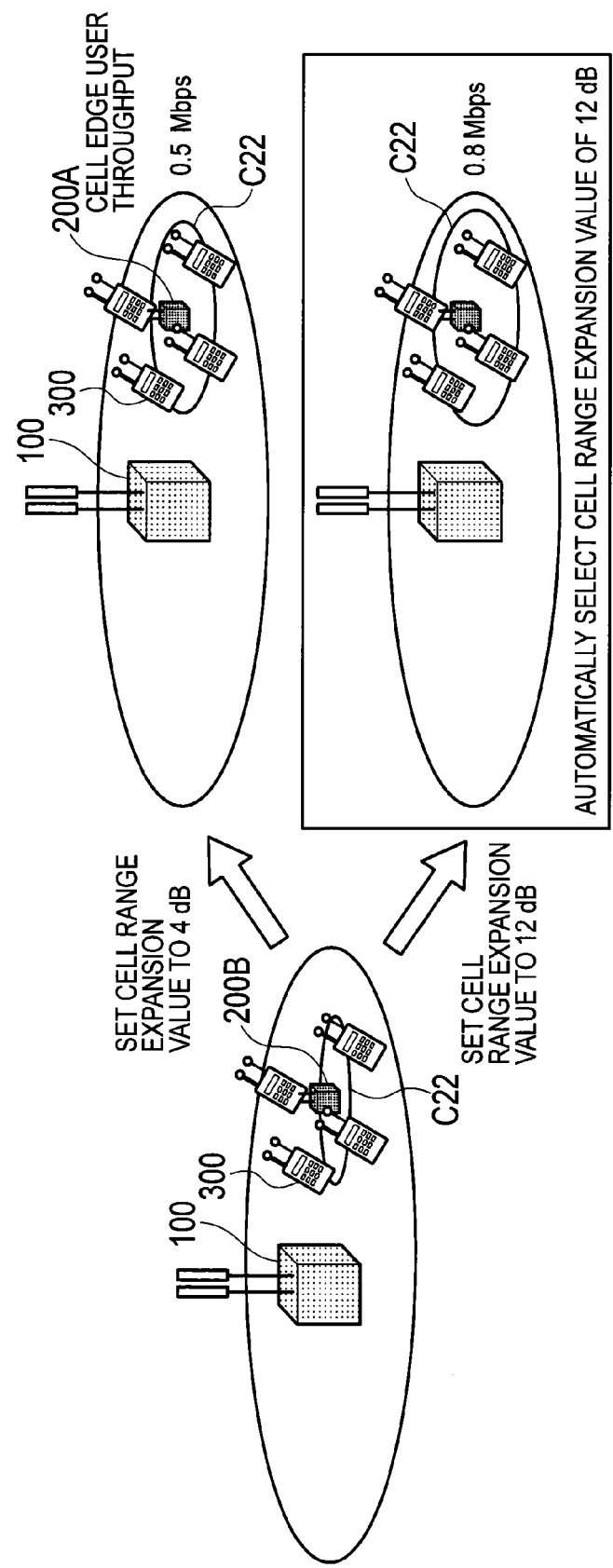
FIG. 10 is an explanatory view of Control Example 3 of the cell range expansion value by the communication control device 50 according to the embodiment of the present invention.
Figure 11:
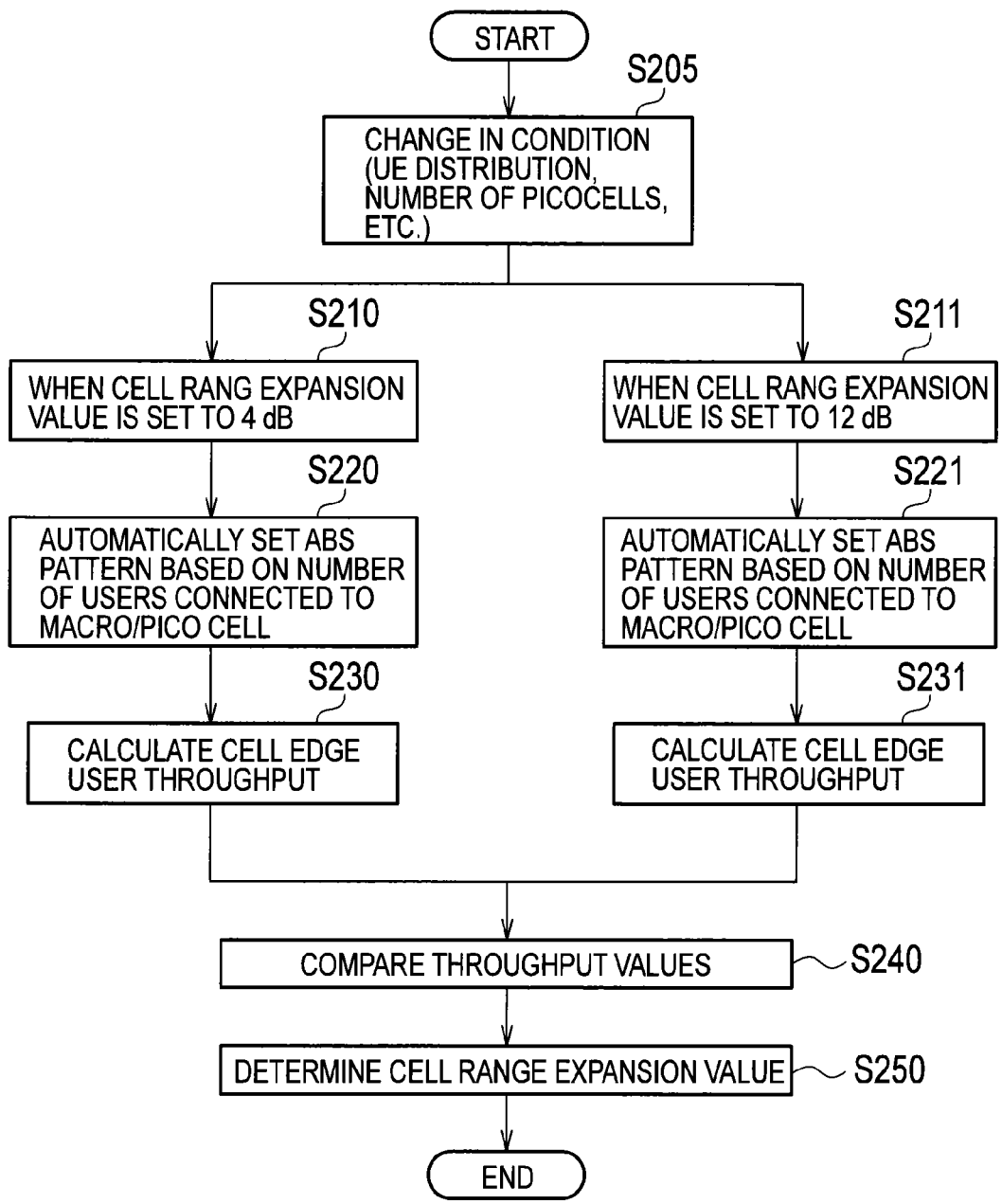
FIG. 11 is a view showing an operational flow in Control Example 3 of the cell range expansion value by the communication control device 50 according to the embodiment of the present invention.

FIG. 10 is an explanatory view of Control Example 3 of the cell range expansion value by the communication control device 50. FIG. 11 shows an operational flow in Control Example 3 of the cell range expansion value by the communication control device 50.

In Control Example 3, as shown in FIG. 10, when the number of the mobile stations 300 located in a specific area (such as the picocell C22) is increased, user throughput at a cell edge is calculated under setting of each of cell range expansion values corresponding to the number of the mobile stations 300, and the cell range expansion value that achieves the highest throughput is selected therefrom.

Specifically, as shown in FIG. 11, when a condition such as distribution of the mobile stations 300 (UE) or the number of picocells is changed (S205), the communication control device 50 sets the almost blank subframe pattern under the setting of each of the multiple cell range expansion values (4 dB and 12 dB in the example shown in FIG. 11), and calculates the user throughput at the cell edge (such as the cell edge of the picocell C22) for each of the settings (S210 to S230 and S211 to S231).

In addition, the communication control device 50 compares the multiple values of the user throughput thus calculated (S240), and selects the cell range expansion value that achieves the highest throughput (S250).

In other words, in Control Example 3, the parameter acquisition unit 51 of the communication control device 50 acquires the numbers of the mobile stations 300 connected to the picocell C21, C22, and the multiple cell range expansion values. The parameter determination unit 53 calculates the throughput of the mobile stations 300 (the user throughput) located at the cell edge of the picocell C21 (C22) in the case of expanding the cell radius of the picocell on the basis of each of the multiple cell range expansion values, and determines the cell range expansion value that achieves the highest throughput among the multiple cell range expansion values on the basis of the throughput thus calculated.

(3.3) Transmission Power Control Parameter

Figure 12:
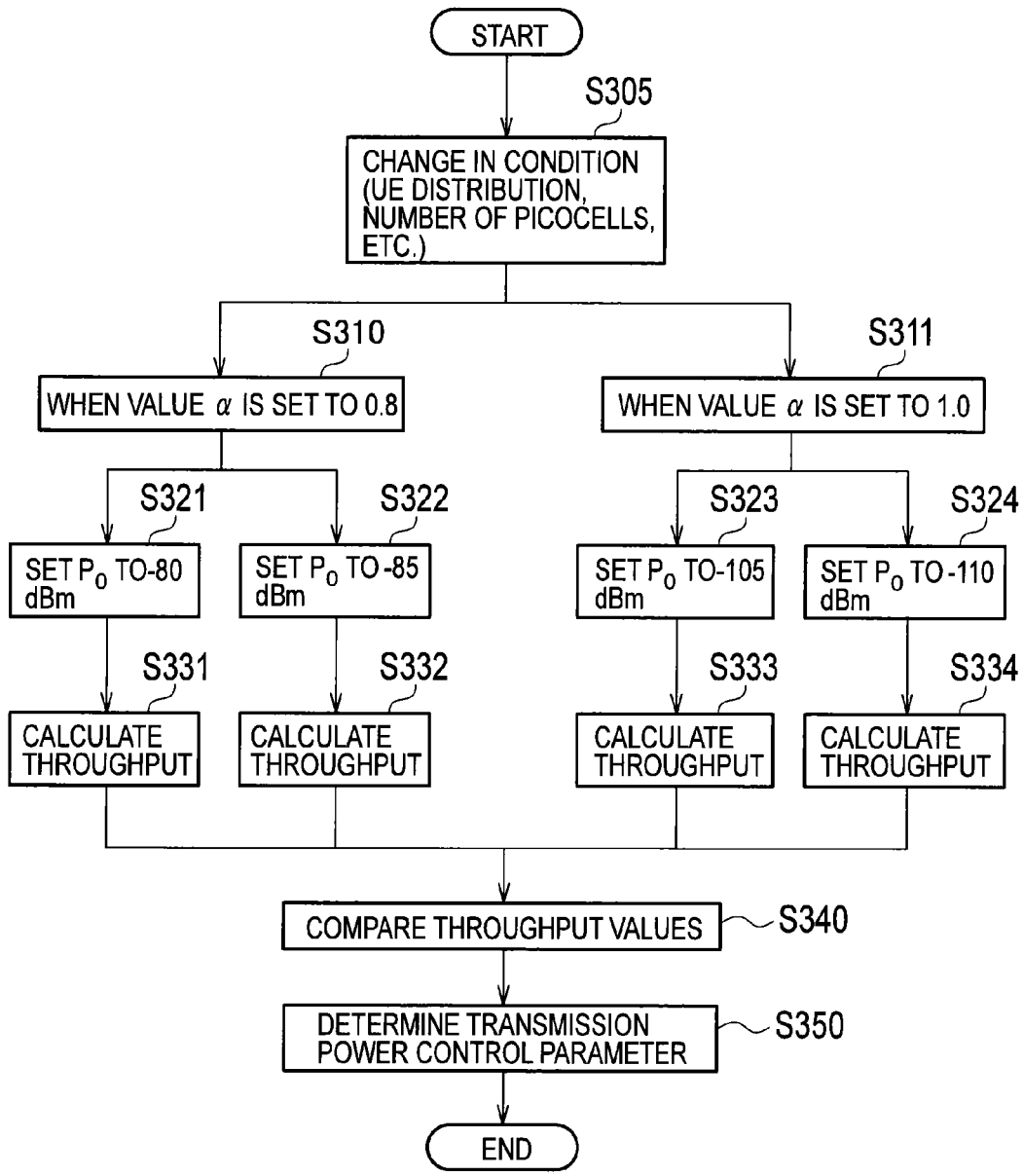
FIG. 12 is a view showing an operational flow in a control example of a transmission power control parameter by the communication control device 50 according to the embodiment of the present invention.

FIG. 12 shows an operational flow in a control example of a transmission power control parameter by the communication control device 50. In this control example, the transmission power control parameter is set automatically on the basis of a maximum throughput reference value of the mobile stations 300 (the users) located in the cell (the cell edge, to be more precise). Specifically, a value that maximizes the throughput of the users located in the cell (cell edge users) is set as the transmission power control parameter.

When the number of the mobile stations 300 located in a specific area (such as the picocell C22) is increased, for example, user throughput at a cell edge is calculated under the setting of each of transmission power control parameters corresponding to the number of the mobile stations 300, and the transmission power control parameter value that achieves the highest throughput is selected therefrom.

Specifically, as shown in FIG. 12, when a condition such as the distribution of the mobile stations 300 (UE) or the number of picocells is changed (S305), the communication control device 50 calculates the user throughput inside a cell (such as the picocell C22) or at an edge of the cell under settings of multiple coefficients α (0.8 and 1.0 in the example shown in FIG. 7) and under settings of transmission power $P_0$ to predetermined values (−80, −85, −105, −110 dBm) (S310 to S332 and S311 to S334).

In addition, the communication control device 50 compares the multiple values of the user throughput thus calculated (S340), and selects the transmission power control parameter (the transmission power $P_0$) that achieves the highest user throughput (S350).

In other words, in this control example, the parameter acquisition unit 51 of the communication control device 50 acquires the number of the mobile stations 300 connected to the picocell C21 (C22). Based on the number of the mobile stations 300 connected to the picocell C21 (C22), the parameter determination unit 53 calculates candidates of the transmission power $P_0$ of a radio signal from the base station 200A (200B) to the mobile stations 300 located in the cell as well as candidates of the throughput of the mobile stations (the user throughput) on the basis of the transmission power, and determines the candidate of the transmission power that achieves the highest throughput.

(3.4) Picocell Transmission Power

Figure 13:
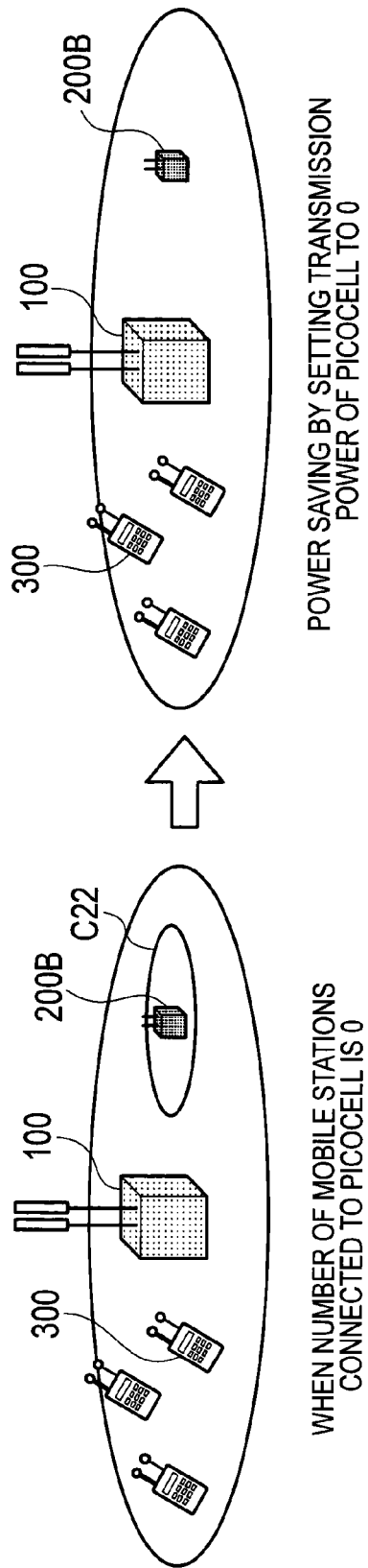
FIG. 13 is an explanatory view of a control example of picocell transmission power by the communication control device 50 according to the embodiment of the present invention.

FIG. 13 is an explanatory view of a control example of picocell transmission power by the communication control device 50. In this control example, the communication control device 50 acquires information indicating the load factors of the respective cells, and controls a transmission power value of a picocell for the purpose of load distribution among the cells.

FIGS. 14(*a*) and 14(*b*) show operational flows of the control example of the picocell transmission power by the communication control device 50. Specifically, FIG. 14(*a*) shows an operational flow in the case of turning on power for the picocell on the basis of the load factor of the macrocell. FIG. 14(*b*) shows an operational flow in the case of turning off the power for the picocell on the basis of the load factor of the picocell.

As shown in FIG. 14(*a*), the communication control device 50 determines whether or not the load factor of the macrocell is greater than the predetermined value α (S410). When the load factor of the macrocell is greater than the value α, the communication control device 50 controls the picocell in such a manner as to turn on the power for the picocell (S420). As a consequence, a radio signal is transmitted from the picocell.

Meanwhile, as shown in FIG. 14(*b*), the communication control device 50 determines whether or not the load factor of the picocell is smaller than the predetermined value β (S411). When the load factor of the picocell is smaller than the value β, the communication control device 50 controls the picocell in such a manner as to turn off the power for the picocell (S421). As a consequence, the transmission of the radio signal from the picocell is stopped.

According to this control example, when the number of the mobile stations 300 connected to the picocell C22, for example, is 0 as shown in FIG. 13, the communication control device 50 sets the transmission power of the base station 200B to zero, thereby achieving power saving of the base station 200B.

Alternatively, when the number of the mobile stations 300 connected to the picocell C22 is reduced, the communication control device 50 may increase a tilt angle of a transmission antenna of the base station 100 (the macro base station).

(4) Examples of Operation and Effect

The above-described mobile communication system 1 determines the parameters on the basis of the number of the mobile stations 300 connected to the macrocell C11 or the number of the mobile stations 300 connected to the picocell C21, C22, or more specifically, determines the ABS pattern, the RNTP pattern, the cell range expansion value, the transmission power value, and the tilt angle of the transmission antenna. For this reason, the mobile communication system 1 can determine the optimum control parameter for the number of the mobile stations connected to any of the macrocell C11 and the picocells C21, C22. In other words, the mobile communication system 1 can autonomously optimize the parameter that changes depending on the inter-cell interference coordination in the heterogeneous network using the various types of cells with different transmission power levels.

(5) Other Embodiments

As described above, the details of the present invention have been disclosed by using an embodiment of the present invention. However, it should not be understood that the description and drawings which constitute part of this disclosure limit the present invention. From this disclosure, various alternative embodiments, examples, and operation techniques will be easily found by those skilled in the art.

For example, in the above-described embodiment, the communication control device 50 has been explained as the one configured to perform the processing in accordance with the flows shown in FIGS. 5 to 9, 11, 12, and 14. Instead, the communication control device 50 may determine the second parameter by using a table in which a changed condition (a first parameter) is associated with a parameter value (a second parameter) for the changed condition. For instance, if the number of the mobile stations 300 connected to a picocell is three or four stations, then the communication control device 50 may set the cell range expansion value to 8 dB (in the case of three stations) or 12 dB (in the case of four stations) without calculating the served cell throughput or the like.

Meanwhile, the embodiment has been described above by using the mobile communication system in compliance with the LTE-A as the example. However, the present invention is naturally applicable not only to the LTE-A but also to other mobile communication systems configured to execute inter-cell interference coordination in a heterogeneous network using various types of cells with different transmission power levels.

Furthermore, in the above-described embodiment, the communication control device 50 is provided in a core network. Instead, it is possible to provide the communication control device 50 inside the base station 100, and to cause the communication control device 50 to acquire the information from the base stations 200A, 200B and control the base stations 200A and 200B.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2011-119734 (filed on May 27, 2011) is incorporated herein by reference.

INDUSTRIAL APPLICABILITY

According to the features of the present invention, it is possible to provide a communication control device and a communication control method which are capable of autonomously optimizing a parameter that changes depending on inter-cell interference coordination in a heterogeneous network.

EXPLANATION OF THE REFERENCE NUMERALS 1 mobile communication system
50 communication control device
51 parameter acquisition unit
53 parameter determination unit
55 parameter notification unit
100, 200A, 200B base station
300 mobile station
C11 macrocell
C21, C22 picocell

The invention claimed is:

1. A communication control device configured to control a first base station forming a first cell having a predetermined cell radius and a second base station forming a second cell having a cell radius smaller than the predetermined cell radius and being overlaid completely within a coverage area of the first cell, the communication control device comprising:
processing circuitry configured to:
acquire a first parameter determined based on a number of mobile stations connected to the first cell or a number of mobile stations connected to the second cell;
determine a second parameter based on the first parameter, the second parameter causing a change in a number of mobile stations connectable to the first cell or a number of mobile stations connectable to the second cell;
notify at least any one of the first base station and the second base station of the second parameter;
acquire a load factor of the first cell and a load factor of the second cell as the first parameter;
determine a Cell Range Expansion value as the second parameter;
set an Almost Blank Subframe pattern used in an inter-cell interference coordination in a time domain or a Relative Narrowband TX Power pattern used in an inter-cell interference coordination in a frequency domain based on the load factor of the first cell and the load factor of the second cell; and
determine the Cell Range Expansion value by which a difference between the load factor of the first cell and the load factor of the second cell is made within a predetermined range.

2. A communication control method of controlling a first base station forming a first cell having a predetermined cell radius and a second base station forming a second cell having a cell radius smaller than the predetermined cell radius and being overlaid completely within a coverage area of the first cell, the communication control method comprising:
acquiring a first parameter determined based on a number of mobile stations connected to the first cell or a number of mobile stations connected to the second cell;
determining a second parameter based on the acquired first parameter, the second parameter causing a change in a number of mobile stations connectable to the first cell or a number of mobile stations connectable to the second cell; and
notifying at least any one of the first base station and the second base station of the determined second parameter
notify at least any one of the first base station and the second base station of the second parameter;
the acquiring further including acquiring a load factor of the first cell and a load factor of the second cell as the first parameter; and
the determining further including
determining a Cell Range Expansion value as the second parameter,
setting an Almost Blank Subframe pattern used in an inter-cell interference coordination in a time domain or a Relative Narrowband TX Power pattern used in an inter-cell interference coordination in a frequency domain based on the load factor of the first cell and the load factor of the second cell, and
determining the Cell Range Expansion value by which a difference between the load factor of the first cell and the load factor of the second cell is made within a predetermined range.

* * * * *